US012789638B2

(12) United States Patent
Cho et al.

(10) Patent No.: US 12,789,638 B2
(45) Date of Patent: Nov. 10, 2026

(54) ELECTRIFIED VEHICLE AND METHOD OF CONTROLLING REGENERATIVE BRAKING THEREOF

(71) Applicants: Hyundai Motor Company, Seoul (KR); Kia Corporation, Seoul (KR)

(72) Inventors: Jin Kyeom Cho, Suwon-si (KR); Joon Shik Park, Seoul (KR); Jeong Yeop Woo, Incheon (KR); Dong Hoon Lee, Suwon-si (KR); Dae Ro Park, Gyeonggi-do (KR); Han Seung Myoung, Taean-gun (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 243 days.

(21) Appl. No.: 18/672,246

(22) Filed: May 23, 2024

(65) Prior Publication Data

US 2025/0135898 A1 May 1, 2025

(30) Foreign Application Priority Data

Oct. 31, 2023 (KR) ........................ 10-2023-0148558

(51) Int. Cl.

| | |
|---|---|
| ***B60L 7/18*** | (2006.01) |
| ***B60L 15/20*** | (2006.01) |
| ***B60L 58/13*** | (2019.01) |
| ***B60L 58/15*** | (2019.01) |
| ***B60W 10/02*** | (2006.01) |
| ***B60W 10/188*** | (2012.01) |
| ***B60W 20/00*** | (2016.01) |

(Continued)

(52) U.S. Cl.

CPC ................. *B60L 7/18* (2013.01); *B60L 15/20* (2013.01); *B60L 58/13* (2019.02); *B60L 58/15* (2019.02); *B60W 10/02* (2013.01); *B60W 10/188* (2013.01); *B60W 20/00* (2013.01); *B60W 30/18127* (2013.01); *B60L 58/12* (2019.02); *B60L 2240/423* (2013.01); *B60W 2510/083* (2013.01); *B60W 2510/244* (2013.01)

(58) Field of Classification Search

CPC .. B60L 7/18; B60L 15/20; B60L 58/13; B60L 58/15; B60W 10/02; B60W 10/188; B60W 20/00; B60W 30/18127

USPC ........................................................... 701/22

See application file for complete search history.

(56) References Cited

U.S. PATENT DOCUMENTS

| | | | | |
|---|---|---|---|---|
| 11,794,745 | B2 * | 10/2023 | Shin | B60L 7/10 |
| 11,845,360 | B2 * | 12/2023 | Espig | B60L 7/18 |
| 2018/0326852 | A1 * | 11/2018 | Shiozawa | B60W 40/076 |

(Continued)

FOREIGN PATENT DOCUMENTS

| | | | | |
|---|---|---|---|---|
| KR | 10-20250062997 | * | 5/2025 | B60Q 1/543 |
| KR | 20250075235 A | | 5/2025 | |

*Primary Examiner* — Jacob S. Scott
*Assistant Examiner* — Michael E Butler
(74) *Attorney, Agent, or Firm* — Slater Matsil, LLP

(57) ABSTRACT

In an electrified vehicle implementing a regenerative braking control method thereof, where the vehicle includes a motor and a controller, the control can be configured to determine a target regenerative torque of the motor and control the motor provided in the vehicle based on the determined target regenerative torque according to comparison results between regenerative charging efficiency of the vehicle and another regenerative charging efficiency of another vehicle, while the vehicle is towed by the other vehicle or while the vehicle tows the other vehicle.

20 Claims, 7 Drawing Sheets

(51) Int. Cl.
*B60W 30/18* (2012.01)
*B60L 58/12* (2019.01)

(56) References Cited

U.S. PATENT DOCUMENTS

| | | | | |
|---|---|---|---|---|
| 2020/0231045 | A1* | 7/2020 | Shin | B60L 15/2045 |
| 2024/0025264 | A1* | 1/2024 | Treharne | B60L 50/60 |
| 2024/0149863 | A1* | 5/2024 | Shin | B60L 7/18 |
| 2024/0190255 | A1* | 6/2024 | Kim | B60L 7/26 |
| 2025/0162587 | A1 | 5/2025 | Lee et al. | |

* cited by examiner

ELECTRIFIED VEHICLE AND METHOD OF CONTROLLING REGENERATIVE BRAKING THEREOF

CROSS-REFERENCE TO RELATED APPLICATIONS

This application claims the benefit of Korean Patent Application No. 10-2023-0148558, filed on Oct. 31, 2023, which application is hereby incorporated herein by reference.

TECHNICAL FIELD

The present disclosure relates to an electrified vehicle and a regenerative braking control method thereof during towing.

BACKGROUND

With the recent surge of interest in the environment, there has been an increase in the adoption of eco-friendly vehicles equipped with electric motors as their power source. These eco-friendly vehicles are also known as electrified vehicles and encompass various types, including hybrid electric vehicles (HEVs) and electric vehicles (EVs).

The motors provided in electrified vehicles can harness the driving force of the wheels to charge batteries when the vehicles decelerate. This process is known as braking energy regeneration or regenerative braking. More specifically, when braking is required, the total braking amount (torque) is first calculated based on the braking requirement, and regenerative braking may be performed using the motor within the total braking amount.

In general, regenerative braking is performed when a vehicle decelerates while driving on its power. However, in a situation such as battery discharge, a vehicle in tow behind another vehicle for battery recharge can output regenerative torque through the motor to perform regenerative braking.

On the other hand, in a situation where a vehicle is towed by another vehicle or tows another vehicle, the towing vehicle and the vehicle in tow can independently perform regenerative braking. Consequently, there is a need to consider the overall regenerative charging efficiency and driving stability for the plurality of vehicles combined.

The matters described above as background technology are intended to provide a better understanding of the background of the present disclosure and should not be considered as acknowledging that this information forms the prior art already publicly known, available, or in use.

SUMMARY

The present disclosure relates to an electrified vehicle and a regenerative braking control method thereof configured to improve the regenerative charging efficiency and driving stability through regenerative braking during towing situations where the vehicle is towed by another vehicle or tows another vehicle.

An embodiment of the present disclosure can provide an electrified vehicle configured to ensure driving stability while improving total regenerative charging efficiency through regenerative braking while the vehicle is towed by another vehicle or tows another vehicle.

Technical issues of the present disclosure are not necessarily limited to the technical issues mentioned above, and other technical issues not mentioned may be clearly understood by those skilled in the art to which the present disclosure pertains from the following description.

An electrified vehicle according to an embodiment of the present disclosure, which may resolve issues described above, includes a motor and a controller configured to determine a first target regenerative torque of the motor based on a first maximum regenerative torque capacity of the vehicle or a second maximum regenerative torque capacity of another vehicle and based on a total braking torque requirement. The controller is further configured to control the motor based on the determined first target regenerative torque according to comparison results between a first regenerative charging efficiency of the vehicle and a second regenerative charging efficiency of the other vehicle, while the vehicle is towed by the other vehicle or tows the other vehicle.

For example, the controller can be configured to determine the first target regenerative torque of the motor based on the first maximum regenerative torque capacity and the total braking torque requirement in response to the first regenerative charging efficiency of the vehicle being greater than the second regenerative charging efficiency of the other vehicle.

For example, the controller can be configured to determine the first maximum regenerative torque capacity of the vehicle to be the first target regenerative torque of the motor in response to the total braking torque requirement being equal to or greater than the first maximum regenerative torque capacity of the vehicle.

For example, the controller can be configured determine the total braking torque requirement to be the first target regenerative torque of the motor in response to the total braking torque requirement being less than the first maximum regenerative torque capacity of the vehicle.

For example, the controller can be configured to determine the first target regenerative torque of the motor based on the second maximum regenerative torque capacity of the other vehicle and based on the total braking torque requirement in response to the first regenerative charging efficiency of the vehicle being less than the second regenerative charging efficiency of the other vehicle.

For example, the controller can be further configured to determine excess of the total braking torque requirement over the second maximum regenerative torque capacity of the other vehicle to be the first target regenerative torque of the motor.

For example, the controller can be further configured to determine half the total braking torque requirement to be the first target regenerative torque of the motor in response to the second regenerative charging efficiency of the other vehicle being equal to the first regenerative charging efficiency of the vehicle.

For example, the controller can be further configured to determine a second target regenerative torque of a second motor in the other vehicle based on the first target regenerative torque of the motor and further configured to transmit the determined first target regenerative torque to the other vehicle.

For example, while the vehicle is towed, the controller can be further configured to determine the first target regenerative torque of the motor based on the first maximum regenerative torque capacity of the vehicle and the total braking torque requirement in response to a state of charge of a battery in the other vehicle exceeding a preset overcharge reference value.

For example, the controller can be further configured to determine the total braking torque requirement to be the first target regenerative torque of the motor in response to the first maximum regenerative torque capacity of the vehicle being equal to or greater than the total braking torque requirement.

For example, the controller can be further configured to determine the first maximum regenerative torque capacity of the vehicle to be the first target regenerative torque of the motor in response to the first maximum regenerative torque capacity of the vehicle being less than a total regenerative torque requirement.

For example, the controller can be further configured to request engine clutch engagement or hydraulic braking of the other vehicle in response to the total braking torque requirement exceeding the first maximum regenerative torque capacity of the vehicle.

For example, the controller can be further configured to request regenerative braking of the other vehicle in response to a state of charge of a battery in the vehicle exceeding a preset overcharge reference value while the vehicle tows.

For example, the controller can be further configured to perform engine clutch engagement or hydraulic braking in response to the total braking torque requirement exceeding the second maximum regenerative torque capacity of the other vehicle.

For example, when the other vehicle tows an additional vehicle in addition to the vehicle, the controller can be further configured to control the motor in the vehicle in further consideration of at least one additional regenerative charging efficiency of additional vehicle.

For example, when the other vehicle is towed by an additional vehicle in addition to the vehicle, the controller can be configured to control the motor in the vehicle in further consideration of an additional regenerative charging efficiency of the additional vehicle.

A method vehicle according to an embodiment of the present disclosure includes determining a first target regenerative torque of a motor in the vehicle based on either a first maximum regenerative torque capacity of the vehicle or a second maximum regenerative torque capacity of another vehicle, and based on a total braking torque requirement according to comparison results between a first regenerative charging efficiency of the vehicle and a second regenerative charging efficiency of the other vehicle while the vehicle is towed by the other vehicle or while the vehicle tows the other vehicle. The motor in the vehicle is controlled based on the determined first target regenerative torque.

For example, the method may further comprise the following steps:

- in response to the first regenerative charging efficiency of the vehicle being greater than the second regenerative charging efficiency of the other vehicle, determining the first target regenerative torque of the motor based on the first maximum regenerative torque capacity and the total braking torque requirement;
- in response to the first regenerative charging efficiency of the vehicle being greater than the second regenerative charging efficiency of the other vehicle, and the total braking torque requirement being equal to or greater than the first maximum regenerative torque capacity of the vehicle, determining the first maximum regenerative torque capacity of the vehicle to be the first target regenerative torque of the motor;
- in response to the first regenerative charging efficiency of the vehicle being greater than the second regenerative charging efficiency of the other vehicle, and the total braking torque requirement being less than the first maximum regenerative torque capacity of the vehicle, determining the total braking torque requirement to be the first target regenerative torque of the motor;
- in response to the first regenerative charging efficiency of the vehicle being less than the second regenerative charging efficiency of the other vehicle, determining the first target regenerative torque of the motor based on the second maximum regenerative torque capacity of the other vehicle and based on the total braking torque requirement, and determining excess of the total braking torque requirement over the second maximum regenerative torque capacity of the other vehicle to be the first target regenerative torque of the motor; and
- in response to the second regenerative charging efficiency of the other vehicle being equal to the first regenerative charging efficiency of the vehicle, determining half the total braking torque requirement to be the first target regenerative torque of the motor.

For example, while the vehicle is towed and a state of charge of a battery in the other vehicle exceeding a preset overcharge reference value, the method may further comprise determining the first target regenerative torque of the motor based on the first maximum regenerative torque capacity of the vehicle and the total braking torque requirement, in response to the first maximum regenerative torque capacity of the vehicle being equal to or greater than the total braking torque requirement, determining the total braking torque requirement to be the first target regenerative torque of the motor, in response to the first maximum regenerative torque capacity of the vehicle being less than a total regenerative torque requirement, determining the first maximum regenerative torque capacity of the vehicle to be the first target regenerative torque of the motor, and in response to the total braking torque requirement exceeding the first maximum regenerative torque capacity of the vehicle, requesting one of or both of engine clutch engagement and hydraulic braking of the other vehicle.

For example, when a state of charge of a battery in the vehicle exceeds a preset overcharge reference value while the vehicle tows, the method may further comprise requesting regenerative braking of the other vehicle and in response to the total braking torque requirement exceeding the second maximum regenerative torque capacity of the other vehicle, performing engine clutch engagement or hydraulic braking in the vehicle.

According to various embodiments of the present disclosure as described above, the overall regenerative charging efficiency and the driving stability can improve and the efficiency of regenerative braking can be ensured while the vehicle is towed by another vehicle or tows another vehicle.

In some embodiments, the regenerative braking efficiency can be improved when the vehicle tows or is towed so that the fuel efficiency or electricity efficiency of the electrified vehicle may improve.

In some embodiments, battery overcharging when the vehicle tows another vehicle may be prevented.

The advantages achievable by some embodiments of the present disclosure are not necessarily limited to the advantages mentioned above, and other advantages not mentioned above may be clearly understood by those skilled in the art to which the present disclosure pertains from the following description.

DETAILED DESCRIPTION OF ILLUSTRATIVE EMBODIMENTS

Figure 1:
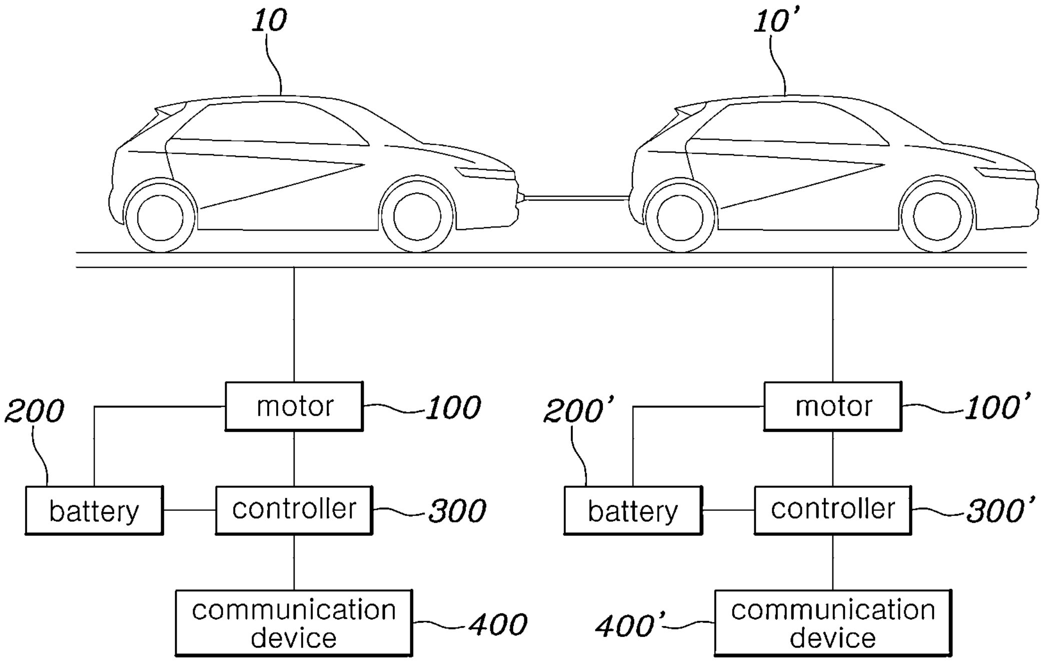
FIGS. 1 and 2 are views illustrating a configuration of a charging system applicable to an electrified vehicle according to some embodiments of the present disclosure.

Specific structural or functional descriptions of some embodiments of the present disclosure are merely illustrative, and embodiments according to the present disclosure may be implemented in various forms and should not be construed as necessarily limited to the example embodiments described in the present disclosure.

Because some embodiments of the present disclosure may be diversely modified and may take various forms, specific example embodiments will be illustrated in the diagrams and described in detail in the present disclosure. However, it can be understood that the present disclosure is not intended to necessarily limit potential embodiments of the present disclosure to specific examples disclosed and that modifications, equivalents, and/or substitutes thereof can be within the spirit and technical scope of the present disclosure.

Unless otherwise defined, terms used herein, including technological or scientific terms, can have a same meaning as terms commonly understood by those skilled in the art to which the present disclosure pertains. Terms defined in commonly used dictionaries can be interpreted as having meanings consistent with the contextual meanings of the related technology.

Hereinafter, embodiments disclosed in the present disclosure will be described in detail with reference to the accompanying drawings, and same reference numerals can be assigned to similar or same components regardless of drawing numbers, and repetitive descriptions can be omitted.

In the following description of some example embodiments, the term "preset" can mean that the value of the parameter is selected, set, or predetermined when the parameter is used in a process or algorithm, for example. The value of a parameter may be set at the start of the process or algorithm or set during an interval or at intervals in which the process or algorithm is performed, depending on the embodiments, for example.

The suffixes "module" and "unit" used for some components in the following description can be given or interchangeably used to facilitate the writing of the specification, without necessarily indicating a distinct meaning or role of their own.

When it is determined that the specific description of the related and already known technology may obscure the essence of the embodiments disclosed herein, such specific description can be omitted. Further, it can be understood that the accompanying drawings are intended to facilitate understanding of the example embodiments disclosed herein and are not intended to necessarily limit the present disclosure. Technical ideas disclosed herein are not necessarily limited to the accompanying drawings and can include all modifications, equivalents, or substitutions within the spirit and technical scope of the present disclosure.

Terms including ordinal numbers such as "first", "second", and the like, may be used to describe various components, but the components are not necessarily limited by such terms. Such terms may be used merely for the purpose of distinguishing one component from another.

It can be understood that when a component is referred to as being "connected" or "coupled" to another component, the component may be directly connected or coupled to the other component, but other components may be interposed therebetween. In contrast, it can be understood that when a component is referred to as being "directly connected" or "directly coupled" to another component, no other component is interposed.

Singular expressions can include plural expressions unless the context explicitly indicates otherwise.

In the present disclosure, terms such as "comprise" or "have" are intended to indicate the presence of implemented features, numbers, steps, manipulations, components, parts, or combinations thereof described in the present disclosure, and are not to be understood to preclude the presence or additional possibilities of one or more of other features, numbers, steps, manipulations, components, parts, or combinations thereof.

Further, a unit or control unit included in the names such as a motor control unit (MCU) and a hybrid control unit (HCU), for example, can be only a term widely used in the industry for naming of a controller for controlling a specific function of a vehicle and does not refer to a generic function unit.

A controller may include a communication device for communicating with other controllers or sensors to control the function that the controller is responsible for, a memory for storing code, operating system(s), logic commands, and input/output information, and one or more processors for performing determination, calculations, and decisions necessary to control the functions the controller is responsible for, any combination of or all of which may be in plural.

An electrified vehicle according to some embodiments of the present disclosure can determine target regenerative torque in consideration of the regenerative charging efficiency and battery state through regenerative braking and control the motor based thereon while the vehicle is towed or tows, thereby improving the regenerative charging efficiency and driving stability while the vehicle tows or is towed.

The towing vehicle or the vehicle in tow may output the drive torque to ensure both vehicles move together while the vehicle is towed and tows, and the towing vehicle and the vehicle in tow may together output the total braking torque requirement for both vehicles when braking is necessary.

The towing vehicle and the vehicle in tow may perform regenerative braking to charge the battery within the total braking torque requirement, and the efficiency of such regenerative braking may improve in some embodiments of the present disclosure.

Figure 2:
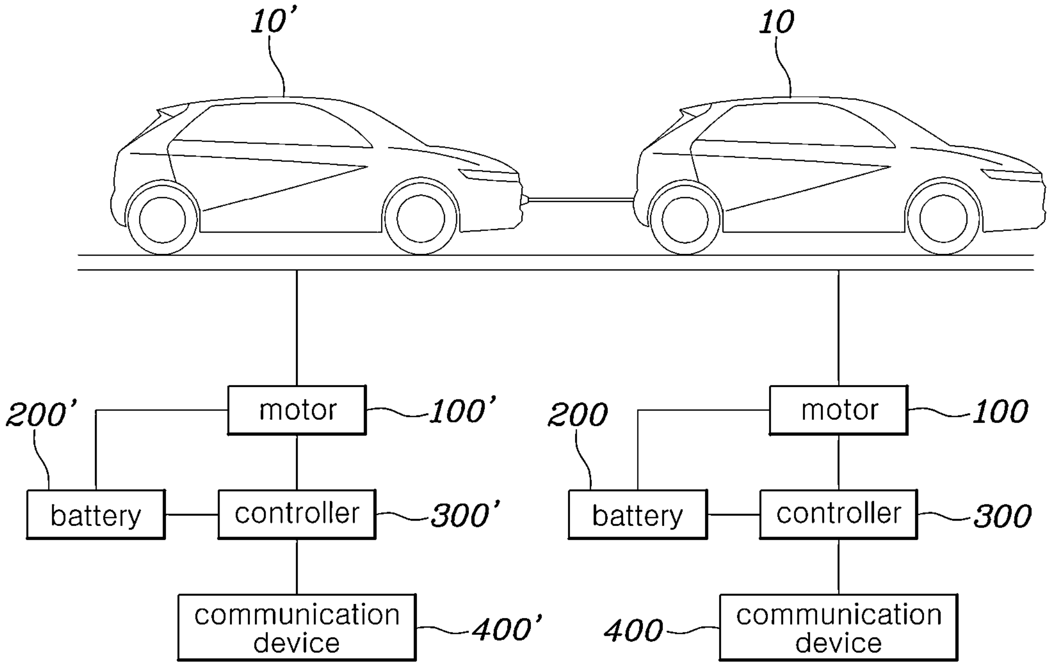

A charging system that can be applied to electrified vehicles while a plurality of vehicles tow or are towed according to some embodiments of the present disclosure will be first described. FIGS. 1 and 2 are views illustrating a configuration of a charging system applicable to an electrified vehicle according to some embodiments of the present disclosure.

FIG. 1 illustrates an electrified vehicle according to an embodiment, in which a vehicle 10 can be implemented as a vehicle in tow in a state of being towed by another vehicle 10'. FIG. 2 illustrates an electrified vehicle according to an embodiment, in which a vehicle 10 can be implemented as a towing vehicle in a state of towing another vehicle 10'.

FIGS. 1 and 2 show an electrified vehicle 10 according to some embodiments of the present disclosure may include a motor 100, a battery 200, a controller 300, and a communication device 400, and may be implemented as a vehicle in tow towed by another vehicle 10' and a towing vehicle towing another vehicle 10' in a charging system.

In the charging system applicable to the electrified vehicle 10 according to some embodiments of the present disclosure, the towing vehicle and the vehicle in tow may drive using the power of the towing vehicle, and the respective motors 100, 100' may charge the respective batteries 200, 200' using the driving force of the wheels provided in each vehicle when decelerating during driving. In this process, the motors 100 or 100' of the vehicle in tow may not be involved in providing the driving force for driving and only one motor 100 or 100' in either the towing vehicle or the vehicle in tow may perform regenerative braking.

On the other hand, FIGS. 1 and 2 mainly illustrate components relevant to the description of some embodiments of the present disclosure, and the actual charging system and electrified vehicle 10 may be implemented with more or fewer components. In the following, the configuration of the electrified vehicle 10, which may be implemented as a vehicle in tow or a towing vehicle, will be described.

The motor 100 may output torque to accelerate the vehicle and also output torque in the opposite direction of driving to decelerate the vehicle, and the connected battery 200 may be charged through braking energy during deceleration.

The battery 200 may supply power to the motor 100 or receive power from the motor 100 for recharging.

The controller 300 may determine the target regenerative torque of the motor 100 according to the comparison results between the regenerative charging efficiency of the vehicle and the other vehicle and control the motor 100 based on the determined target regenerative torque while the vehicle is towed by the other vehicle or tows the other vehicle.

The state in which the vehicle tows or is towed may specifically refer to the state in which the motor 100 continuously outputs regenerative torque to charge the battery 200 connected to the motor 100.

On the other hand, the controller 300 may operate differently depending on whether the vehicle serves as a towing vehicle or a vehicle in tow. Further details on this matter will be described with reference to FIG. 3 below.

The communication device 400 may be provided to perform communication between vehicles and be controlled by the controller 300. For example, the communication devices 400, 400' provided in the respective vehicles 10, 10' may exchange information about regenerative charging efficiency, the maximum regenerative torque that respective motors 100, 100' can output, battery state of charge (SOC), and the like, with each other through wired or wireless communication.

The configuration and operation of the controller 300 will be described in more detail with reference to FIG. 3 below.

Figure 3:
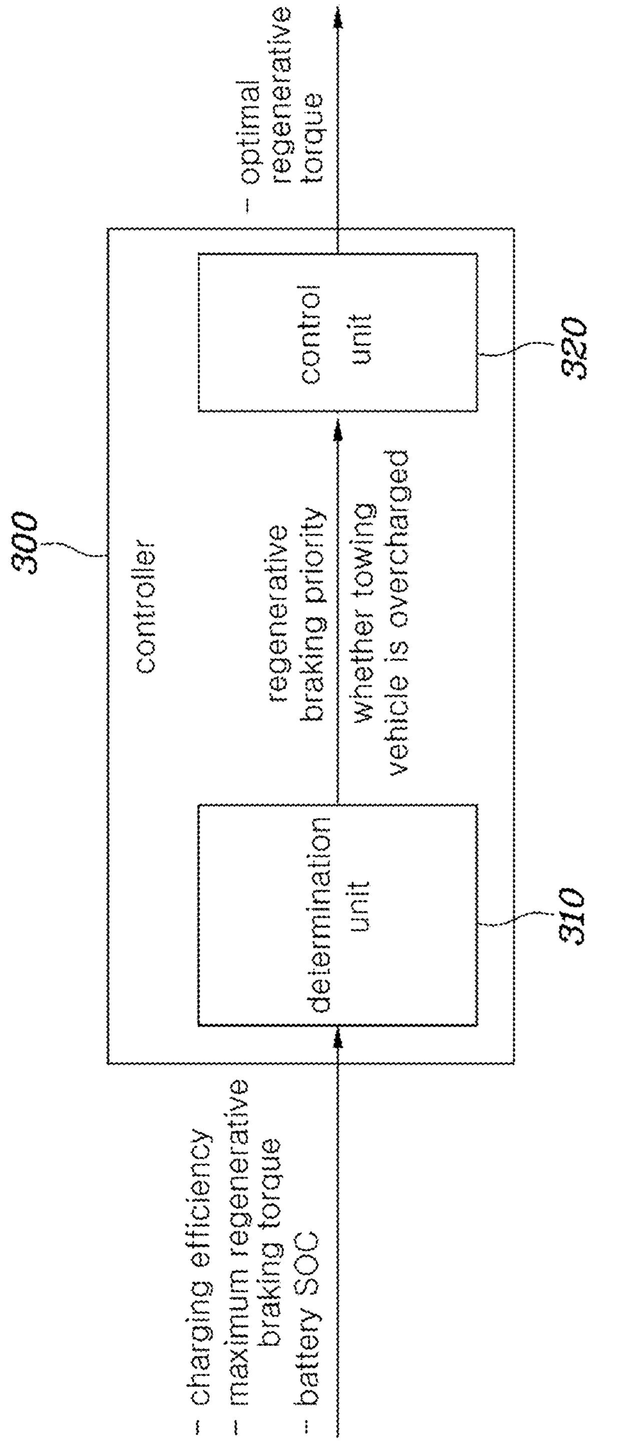
FIG. 3 is a diagram illustrating a controller configuration of an electrified vehicle according to an embodiment of the present disclosure.

FIG. 3 is a diagram illustrating a controller configuration of an electrified vehicle according to an embodiment of the present disclosure.

FIG. 3 shows that the controller 300 of the electrified vehicle according to an embodiment may include a determination unit 310 and a control unit 320, may receive input information such as the regenerative charging efficiency of the vehicle 10 and the other vehicle 10' while the vehicle is towed or tows, the maximum regenerative torque that the motors 100, 100' of the vehicle 10 and the other vehicle 10' can output, and the battery SOC of the vehicle 10 and the other vehicle 10', and may have output information such as the target regenerative torque.

Regarding the input information, more specifically, the regenerative charging efficiency may refer to the charging efficiency through regenerative braking and may be determined based on the efficiency of the motors 100, 100', the efficiency of the batteries 200, 200', and the efficiency of inverters (not shown) connected to the motors 100, 100' and the batteries 200. 200'.

For example, the regenerative charging efficiency of the vehicle 10 may be determined by the vehicle control unit (VCU), motor control unit (MCU), and the like within the vehicle 10 to be supplied to the controller 300, while the regenerative charging efficiency of the other vehicle 10' may be determined in the vehicle 10 based on the information obtained through the communication between the communication devices 400, 400' provided in the vehicle 10 and the other vehicle 10' or obtained from the other vehicle 10' through communication.

The maximum regenerative torque that the motors 100, 100' of the vehicle 10 and the other vehicle 10' can output may vary depending on the performance of the motors 100, 100', the state of the batteries 200, 200', and the like. For example, the maximum regenerative torque of the vehicle 10 may be determined by the VCU, MCU, and the like within the vehicle 10 to be supplied to the controller 300 while the maximum output torque of the other vehicle 10' may be determined in the vehicle 10 based on the information obtained through the communication between the communication devices 400, 400' provided in the vehicle 10 and the other vehicle 10' or obtained from the other vehicle 10' through communication.

The battery SOC is the state of charge of the batteries 200, 200' that may be expressed as a percentage ratio of the charge state of the batteries 200, 200' to the total energy. In particular, in an embodiment of the present disclosure, the battery SOC input in the controller 300 may refer to the battery SOC of the towing vehicle, that is, the battery SOC of the other vehicle 10' when the vehicle 10 is the vehicle in tow and the battery SOC of the vehicle 10 when the vehicle 10 is the towing vehicle.

For example, the battery SOC of the vehicle 10 may be provided to the controller 300 from the VCU, battery management system (BMS), and the like within the vehicle 10 while the battery SOC of the other vehicle 10' may be obtained through communication between the communication devices 400, 400' provided in the vehicle 10 and the other vehicle 10'.

On the other hand, the input information as described above may be directly determined by the controller 300 rather than being obtained from other configurations within the vehicle, depending on the implementations.

Regarding the output information, more specifically, the target regenerative torque may refer to the target regenerative torque of the vehicle 10 that maximizes the total regenerative charging efficiency of the charging system through the vehicle 10 and the other vehicle 10' and may further include the target regenerative torque of the other vehicle 10' in addition to the target regenerative torque of the vehicle 10.

For example, the output of the target regenerative torque of the vehicle 10 may be implemented in the form of a control command that causes the motor 100 to output the target regenerative torque, and the control command may be transmitted to the motor 100 of the vehicle through the BCU, MCU, and the like of the vehicle 10. Further, the output of the target regenerative torque of the other vehicle 10' may be transmitted to the other vehicle 10' through the communication between the communication devices 400, 400' provided in the vehicle 10 and the other vehicle 10' and may be transmitted to the motor 100' of the other vehicle through the VCU, MCU, and the like of the other vehicle 10'.

The determination unit 310 may determine the target regenerative torque of the motor 100 provided in the vehicle 10 based on either the maximum regenerative torque capacity of vehicle 10 or the maximum regenerative torque capacity of the other vehicle 10', or both, and the total braking torque requirement according to the comparison results between the regenerative charging efficiency of the vehicle 10 and the regenerative charging efficiency of the other vehicle 10' while the vehicle is towed by the other vehicle 10' or tows the other vehicle 10'. The total braking torque requirement may refer to the torque required for the total braking of both the vehicle 10 and the other vehicle 10'.

The control unit 320 may control the motor 100 provided in the vehicle 10 based on the target regenerative torque determined by the determination unit 310. More specifically, the controller 300 may adjust the regenerative torque output through the motor 100 based on the determined target regenerative torque while the vehicle tows or is towed and may consequently control the charging of the battery 200 through regenerative braking.

More specifically, when the comparison results show that the regenerative charging efficiency of the vehicle 10 is greater than the regenerative charging efficiency of the other vehicle 10', the determination unit 310 may determine the target regenerative torque of the motor 100 provided in the vehicle 10 based on the maximum regenerative torque capacity of the vehicle 10 and the total braking torque requirement.

When the total braking torque requirement is equal to or greater than the maximum regenerative torque capacity of the vehicle 10, that is, when the regenerative torque of the vehicle 10 alone cannot satisfy the total braking torque requirement, the determination unit 310 may determine the maximum regenerative torque capacity of the vehicle 10 to be the target regenerative torque of the motor 100 provided in the vehicle 10. In contrast, when the total braking torque requirement is less than the maximum regenerative torque capacity of the vehicle 10, that is, when the regenerative torque of the vehicle 10 alone can satisfy the total braking torque requirement, the determination unit 310 may determine the total braking torque requirement to be the target regenerative torque of the motor 100 provided in the vehicle 10.

On the other hand, when the regenerative charging efficiency of the vehicle 10 is less than the regenerative charging efficiency of the other vehicle 10', the determination unit 310 may determine the target regenerative torque of the motor 100 provided in the vehicle 10 based on the maximum regenerative torque capacity of the other vehicle 10' and the total braking torque requirement.

The determination unit 310 may determine the excess of the total braking torque requirement over the maximum regenerative torque capacity of the other vehicle 10' to be the target regenerative torque of the motor 100 provided in the vehicle 10.

Further, when the regenerative charging efficiency of the other vehicle 10' is the same as the regenerative charging efficiency of the vehicle 10, the determination unit 310 may determine half the total braking torque requirement to be the target regenerative torque of the motor 100 provided in the vehicle 10.

On the other hand, the other vehicle 10' may tow one or more additional vehicles or may be towed by one or more additional vehicles in addition to the vehicle 10. The determination unit 310 may further consider the regenerative charging efficiency of one or more additional vehicles, and the control unit 320 may control the motor 100 provided in the vehicle 10 accordingly.

The determination unit 310 may not only determine the target regenerative torque of the vehicle 10 but also determine the target regenerative torque of the motor provided in the other vehicle 10' based on the target regenerative torque of the motor 100 provided in the vehicle 10. That is, the determination unit 310 may determine the target regenerative torque of both the towing vehicle and the vehicle in tow. This matter will be described with reference to FIG. 4.

Figure 4:
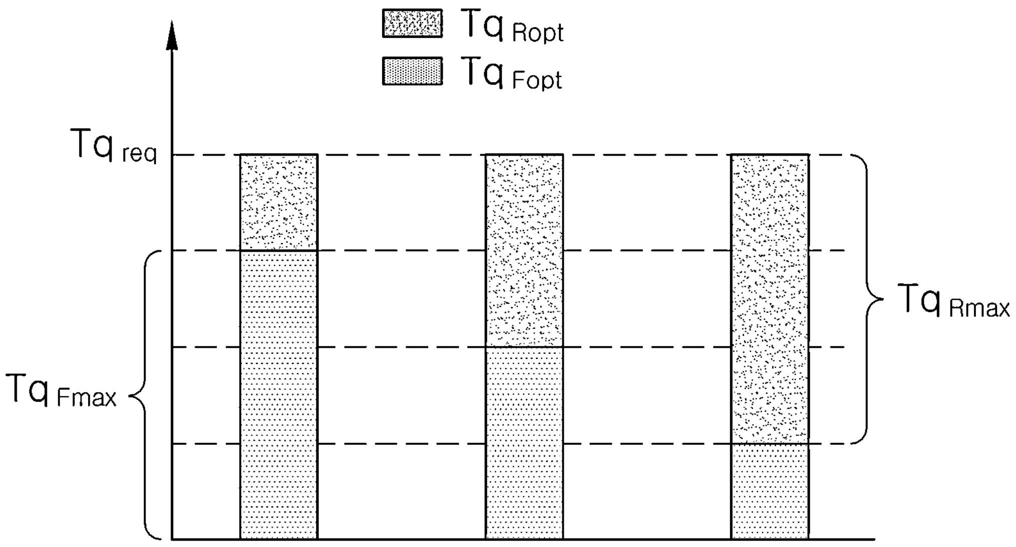
FIG. 4 is a graph describing a method of determining target regenerative torque according to an embodiment of the present disclosure.

FIG. 4 is a graph for describing a method of determining a target regenerative torque according to an embodiment of the present disclosure.

FIG. 4 illustrates a graph showing the allocation of the total braking torque requirement ($Tq_{req}$) when the maximum regenerative torque ($Tq_{Fmax}$) of the towing vehicle and the maximum regenerative torque ($Tq_{Rmax}$) of the vehicle in tow are respectively less than the total braking torque requirement ($Tq_{req}$). The depiction in FIG. 4 is premised on the vehicle 10 being a vehicle in tow, but the following description may apply when the vehicle 10 is a towing vehicle.

When the regenerative charging efficiency of the other vehicle 10' is greater than the regenerative charging efficiency of the vehicle 10, the allocation of the total braking torque requirement ($Tq_{req}$) may be represented as shown in the left bar.

The total braking torque requirement ($Tq_{req}$) may be first allocated to the other vehicle 10' with higher regenerative charging efficiency, and the target regenerative torque ($Tq_{opt}$) of the vehicle 10 may be determined to be the excess of the total braking torque requirement ($Tq_{req}$) over the maximum regenerative torque that the motor 100' of the other vehicle 10' can output.

When the regenerative charging efficiency of the other vehicle 10' is the same as the regenerative charging efficiency of the vehicle 10, the allocation of the total braking torque requirement ($Tq_{req}$) may be represented as shown in the middle bar.

The total braking torque requirement ($Tq_{req}$) can be evenly allocated to the vehicle 10 and the other vehicle 10' such that the target regenerative torque ($Tq_{opt}$) of the vehicle 10 may be determined to be half the total braking torque requirement ($Tq_{req}$).

When the regenerative charging efficiency of the other vehicle 10' is less than the regenerative charging efficiency of the vehicle 10, the allocation of the total braking torque requirement ($Tq_{req}$) may be represented as shown in the right bar.

The total braking torque requirement ($Tq_{req}$) may be first allocated to the vehicle 10 with higher regenerative charging efficiency, and the target regenerative torque ($Tq_{opt}$) of the vehicle 10 may be determined to be as much as the maximum regenerative torque ($Tq_{Rmax}$) that the motor 100 of the vehicle 10 can output. The target regenerative torque ($Tq_{Fopt}$) of the other vehicle 10' may be determined to be the excess of the total braking torque requirement ($Tq_{req}$) over the maximum regenerative torque ($Tq_{Rmax}$) that the motor 100 of the vehicle 10 can output.

FIG. 3 also shows that the determination unit 310 may determine the target regenerative torque of the motor provided in the vehicle 10 based on the maximum regenerative torque capacity of the vehicle 10 and the total braking torque requirement when the SOC of the battery provided in the other vehicle 10' exceeds a preset overcharge reference value while the vehicle is towed.

When the total braking torque requirement exceeds the maximum regenerative torque capacity of the vehicle 10, the control unit 320 may request either engine clutch engagement or hydraulic braking, or both, of the other vehicle 10' through the communication device 400 while adjusting the regenerative torque that the motor 100 outputs according to the target regenerative torque.

For example, when the total braking torque requirement exceeds the maximum regenerative torque capacity of the vehicle 10, the determination unit 310 may determine the target regenerative torque of the vehicle 10 to be the maximum regenerative torque that the motor 100 of the vehicle 10 can output and transmit a control signal to the other vehicle 10' through the communication device 400 so that the other vehicle 10' may bear the remaining portion of the total braking torque requirement that is not satisfied by the target regenerative torque of the vehicle 10.

The other vehicle 10' may engage the engine clutch and then discontinue fuel injection into the engine to generate creep torque or perform hydraulic braking to bear the remaining portion of the torque that is not satisfied by the target regenerative torque of the vehicle 10. The other vehicle 10' may generate creep torque and perform hydraulic braking simultaneously.

On the other hand, when the SOC of the battery provided in the vehicle 10 exceeds a preset overcharge reference value while the vehicle tows, the control unit 320 may request regenerative braking of the other vehicle 10' through the communication device 400, and upon receiving the request, the other vehicle 10' may perform regenerative braking according to the relationship between the maximum regenerative torque that the motor 100' can output and the total torque requirement.

When the total braking torque requirement exceeds the maximum regenerative torque capacity of the other vehicle 10', the control unit 320 may perform either the engine clutch engagement or the hydraulic braking, or both, to satisfy the total braking torque requirement.

Figure 5:
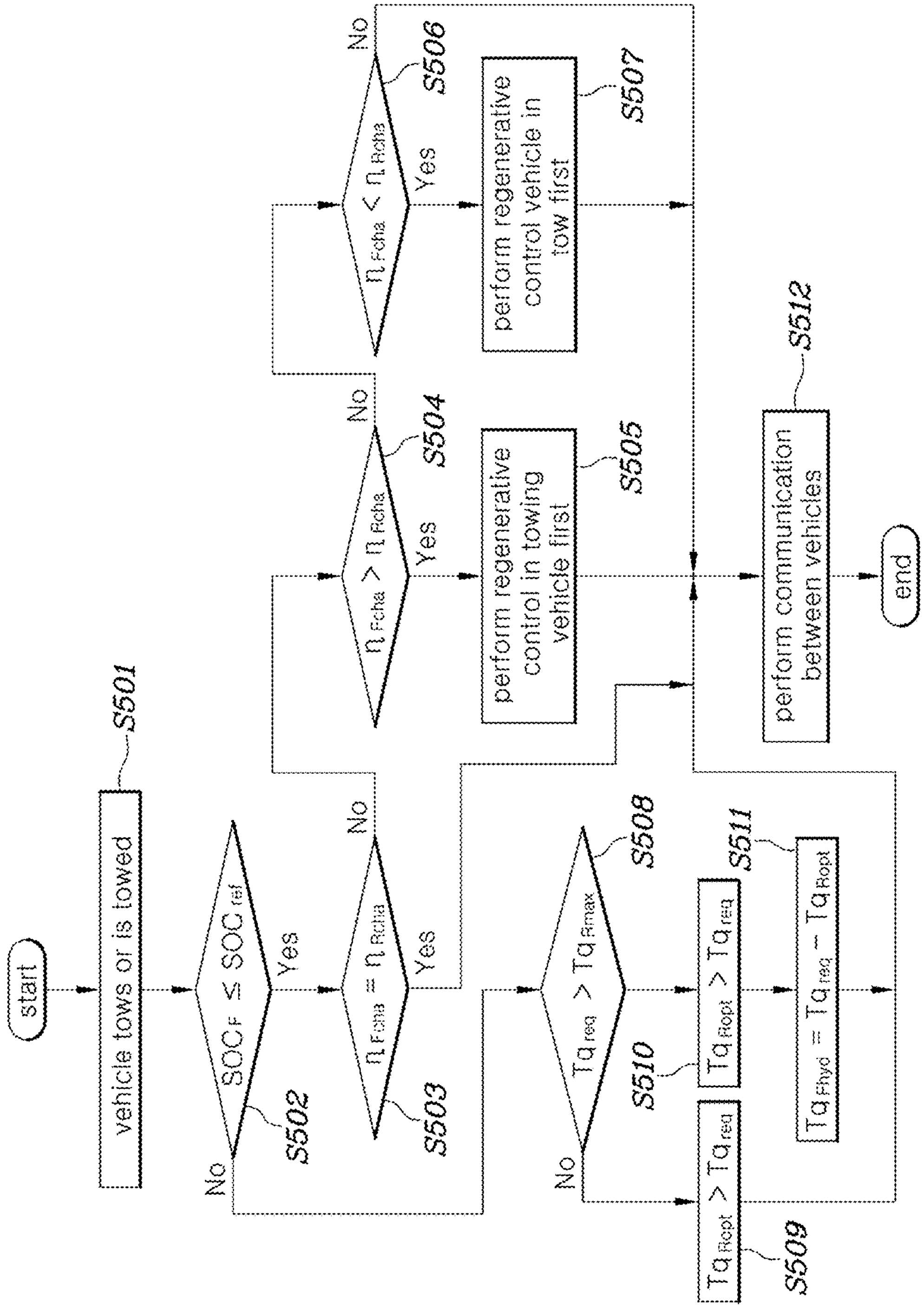
FIG. 5 is a flowchart describing an overall control performing process of a charging system through an electrified vehicle according to some embodiments of the present disclosure.

FIG. 5 is a flowchart describing an overall control performing process of a charging system through an electrified vehicle according to some embodiments of the present disclosure.

FIG. 5 illustrates the control process while the vehicle tows or is towed. In the description related to FIG. 5, the vehicle that is towed is referred to as the vehicle in tow, and the vehicle that performs towing is referred to as the towing vehicle regardless of whether the vehicle is the vehicle 10 or the other vehicle 10' (operation S501).

At operation S502, a comparison may be made between the battery SOC ($SOC_F$) of the towing vehicle and a preset overcharge reference value ($SOC_{ref}$) while the vehicle tows or is towed.

When the battery SOC ($SOC_F$) of the towing vehicle is equal to or less than the preset overcharge reference value ($SOC_{ref}$) (Yes at operation S502), a comparison may be made between the regenerative charging efficiency ($\eta_{Fcha}$) of the towing vehicle and the regenerative charging efficiency ($\eta_{Rcha}$) of the vehicle in tow (operations S503, S504, S506)

Based on the comparison results (at operations S503, S504, S506), regenerative braking through the towing vehicle and the vehicle in tow may be controlled in a direction where the vehicle with higher regenerative charging efficiency performs more regenerative braking. For example, regenerative braking of the towing vehicle may be first performed (operation S505) when the regenerative charging efficiency ($\eta_{Fcha}$) of the towing vehicle is higher than the regenerative charging efficiency ($\eta_{Rcha}$) of the vehicle in tow (Yes at operation S504). For example, regenerative braking of the towing vehicle may be first performed (operation S507) when the regenerative charging efficiency ($\eta_{Fcha}$) of the towing vehicle is lower than the regenerative charging efficiency ($\eta_{Rcha}$) of the vehicle in tow (Yes at operation S506).

When the regenerative charging efficiency ($\eta_{Fcha}$) of the towing vehicle is the same as the regenerative charging efficiency ($\eta_{Rcha}$) of the vehicle in tow (Yes at operation S503) according to the comparison results, regenerative braking may not be prioritized for either the towing vehicle or the vehicle in tow. The total braking torque requirement ($Tq_{req}$) may be evenly allocated to the towing vehicle and the vehicle in tow.

On the other hand, when the battery SOC ($SOC_F$) of the towing vehicle exceeds the preset overcharge reference value ($SOC_{ref}$) (No at operation S502), a comparison may be made between the total braking torque requirement ($Tq_{req}$) and the maximum regenerative torque ($Tq_{Rmax}$) of the vehicle in tow (operation S508).

The target regenerative torque ($Tq_{opt}$) of the vehicle in tow may be determined to be the total braking torque requirement ($Tq_{req}$) (operation S509) when the total braking torque requirement ($Tq_{req}$) is equal to or less than the maximum regenerative torque ($Tq_{Rmax}$) of the vehicle in tow (No at operation S508). The target regenerative torque ($Tq_{opt}$) of the vehicle in tow may be determined to be the maximum regenerative torque ($Tq_{Rmax}$) of the vehicle in tow (operation S510) when the total braking torque requirement ($Tq_{req}$) exceeds the maximum regenerative torque ($Tq_{Rmax}$) of the vehicle in tow (Yes at operation S508). The towing vehicle may perform hydraulic braking rather than regenerative braking, and the hydraulic torque ($Tq_{Fhyd}$) of the towing vehicle may be determined to be the value obtained by subtracting the target regenerative torque ($Tq_{opt}$) of the vehicle in tow from the total braking torque requirement ($Tq_{req}$) (operation S511).

After performing the above operations (operations S501 to S511), communication between the vehicles may be performed (operation S512), and regenerative braking or hydraulic braking may be performed in each vehicle through the communications between the towing vehicle and the vehicle in tow.

Figure 6:
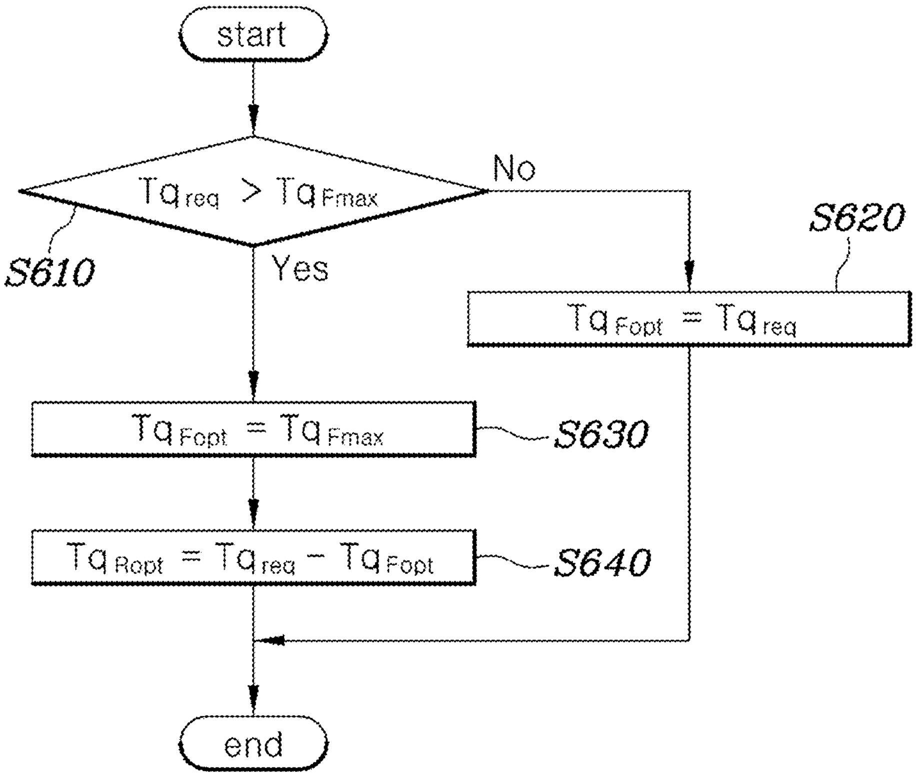
FIG. 6 is a flowchart describing a process in which a towing vehicle first performs a regenerative control in a charging system through an electrified vehicle according to some embodiments of the present disclosure.

FIG. 6 is a flowchart for describing a process in which a towing vehicle first performs a regenerative control prioritizing in a charging system through an electrified vehicle according to some embodiments of the present disclosure.

FIG. 6 illustrates more details on the towing vehicle's first performing regenerative control (operation S505 in FIG. 5).

When the towing vehicle is determined to perform regenerative braking first, a comparison may be made between the total braking torque requirement ($Tq_{req}$) and the maximum regenerative torque ($Tq_{Fmax}$) of the towing vehicle (operation S610).

When the total braking torque requirement ($Tq_{req}$) is equal to or less than the maximum regenerative torque ($Tq_{Fmax}$) of the towing vehicle (No at operation S610), the target regenerative torque ($Tq_{Fopt}$) of the towing vehicle may be determined to be the total braking torque requirement ($Tq_{req}$) (operation S620).

In contrast, when the total braking torque requirement ($Tq_{req}$) exceeds the maximum regenerative torque ($Tq_{Fmax}$) of the towing vehicle (Yes at operation S610), the target regenerative torque ($Tq_{Fop}$t) of the towing vehicle may be determined to be the maximum regenerative torque ($Tq_{Fmax}$) of the towing vehicle (operation S630). The target regenerative torque ($Tq_{Ropt}$) of the vehicle in tow may be determined to be the value obtained by subtracting the target regenerative torque ($Tq_{Fopt}$) of the towing vehicle from the total braking torque requirement ($Tq_{req}$) (operation S640).

Figure 7:
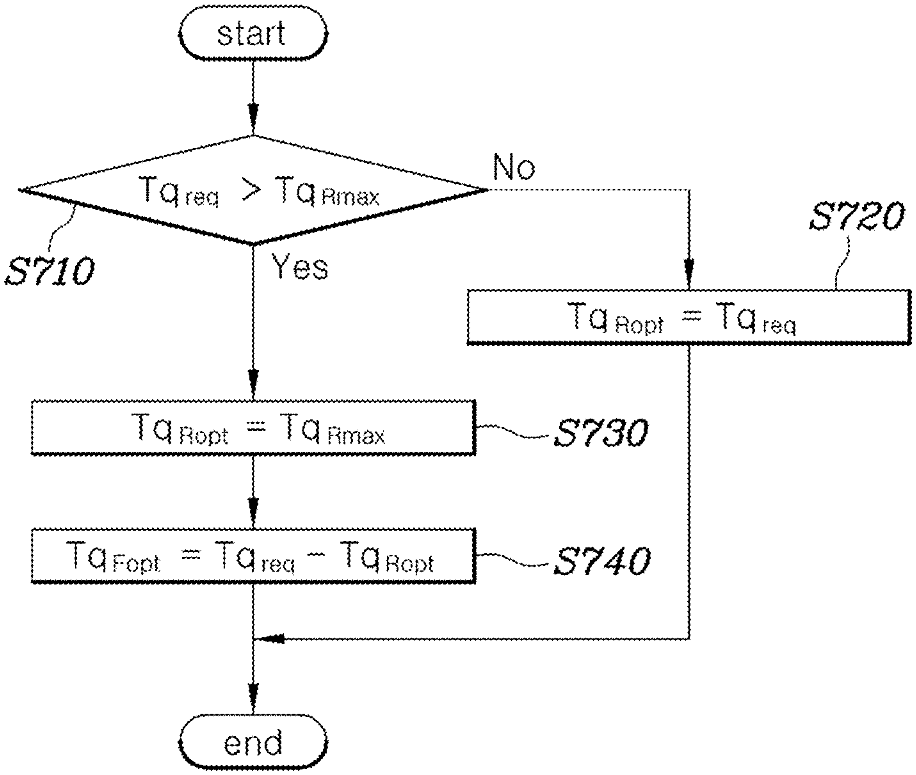
FIG. 7 is a flowchart describing a process in which a vehicle in tow first performs a regenerative control in a charging system through an electrified vehicle according to some embodiments of the present disclosure.

FIG. 7 is a flowchart for describing a process in which a vehicle in tow first performs a regenerative control in a charging system through an electrified vehicle according to some embodiments of the present disclosure.

FIG. 7 illustrates more details on the vehicle-in-tow's first performing the regenerative control (operation S507 in FIG. 5).

When the vehicle in tow is determined to perform regenerative braking first, a comparison may be made between the total braking torque requirement ($Tq_{req}$) and the maximum regenerative torque ($Tq_{Rmax}$) of the vehicle in tow (operation S710).

When the total braking torque requirement ($Tq_{req}$) is equal to or less than the maximum regenerative torque ($Tq_{Rmax}$) of the vehicle in tow (No at operation S710), the target regenerative torque ($Tq_{Ropt}$) of the vehicle in tow may be determined to be the total braking torque requirement ($Tq_{req}$) (operation S720).

In contrast, when the total braking torque requirement ($Tq_{req}$) exceeds the maximum regenerative torque ($Tq_{Rmax}$) of the vehicle in tow (Yes at operation S710), the target regenerative torque ($Tq_{Ropt}$) of the vehicle in tow may be determined to be the maximum regenerative torque ($Tq_{Rmax}$) of the vehicle in tow (operation S730). The target regenerative torque ($Tq_{Fopt}$) of the towing vehicle may be determined to be the value obtained by subtracting the target regenerative torque ($Tq_{Ropt}$) of the vehicle in tow from the total braking torque requirement ($Tq_{req}$) (operation S740).

According to various embodiments of the present disclosure as described above, the overall regenerative charging efficiency and driving stability may improve and the efficiency of regenerative braking may be ensured while the vehicle is towed by another vehicle or tows another vehicle.

In particular, in some embodiments, the regenerative braking efficiency can improve while the vehicle tows or is towed so that the fuel efficiency or electricity efficiency of the electrified vehicle may improve.

Further, in some embodiments, battery overcharge may be prevented while the vehicle tows another vehicle.

According to the various embodiments of the present disclosure as described above, the driving stability while the vehicle is towed by another vehicle can improve and the efficiency of regenerative braking can be ensured.

Specific example embodiments of the present disclosure are illustrated and described above, but some embodiments of the present disclosure may be diversely improved and modified without deviating from the technical spirit of the present disclosure according to the following claims.

What is claimed is:

1. An electrified vehicle comprising:

a motor; and a controller configured to:

determine whether a first regenerative charging efficiency of the electrified vehicle is greater than or less than a second regenerative charging efficiency of an other vehicle different than the electrified vehicle;

in a case when the first regenerative charging efficiency is greater than the second regenerative charging efficiency, determine a first target regenerative torque of the motor based on a first maximum regenerative torque capacity of the electrified vehicle and based on a total braking torque requirement;

in a case when the first regenerative charging efficiency is less than the second regenerative charging efficiency, determine the first target regenerative torque based on a second maximum regenerative torque capacity of the other vehicle and the total braking torque requirement; and control the motor based on the determined first target regenerative torque while the electrified vehicle is towed by the other vehicle or tows the other vehicle.

2. The electrified vehicle of claim 1, wherein the controller is configured to determine the first maximum regenerative torque capacity of the electrified vehicle to be the first target regenerative torque of the motor in response to the total braking torque requirement being equal to or greater than the first maximum regenerative torque capacity of the electrified vehicle.

3. The electrified vehicle of claim 2, wherein the controller is configured to determine the total braking torque requirement to be the first target regenerative torque of the motor in response to the total braking torque requirement being less than the first maximum regenerative torque capacity of the electrified vehicle.

4. The electrified vehicle of claim 1, wherein the controller is further configured to determine excess of the total braking torque requirement over the second maximum regenerative torque capacity of the other vehicle to be the first target regenerative torque of the motor.

5. The electrified vehicle of claim 1, wherein the controller is further configured to determine half the total braking torque requirement to be the first target regenerative torque of the motor in response to the second regenerative charging efficiency of the other vehicle being equal to the first regenerative charging efficiency of the electrified vehicle.

6. The electrified vehicle of claim 1, wherein the controller is further configured to determine a second target regenerative torque of a second motor in the other vehicle based on the first target regenerative torque of the motor, and wherein the controller is further configured to transmit the determined first target regenerative torque to the other vehicle.

7. The electrified vehicle of claim 1, wherein, while the electrified vehicle is being towed, the controller is further configured to determine the first target regenerative torque of the motor based on the first maximum regenerative torque capacity of the electrified vehicle and the total braking torque requirement in response to a state of charge of a battery in the other vehicle exceeding a preset overcharge reference value.

8. The electrified vehicle of claim 7, wherein the controller is further configured to determine the total braking torque requirement to be the first target regenerative torque of the motor in response to the first maximum regenerative torque capacity of the electrified vehicle being equal to or greater than the total braking torque requirement.

9. The electrified vehicle of claim 7, wherein the controller is further configured to determine the first maximum regenerative torque capacity of the electrified vehicle to be the first target regenerative torque of the motor in response to the first maximum regenerative torque capacity of the electrified vehicle being less than a total regenerative torque requirement.

10. The electrified vehicle of claim 7, wherein the controller is further configured to request engine clutch engagement or hydraulic braking of the other vehicle in response to the total braking torque requirement exceeding the first maximum regenerative torque capacity of the electrified vehicle.

11. The electrified vehicle of claim 1, wherein the controller is further configured to request regenerative braking of the other vehicle in response to a state of charge of a battery in the electrified vehicle exceeding a preset overcharge reference value while the electrified vehicle tows the other vehicle.

12. The electrified vehicle of claim 11, wherein the controller is further configured to perform engine clutch engagement or hydraulic braking in response to the total braking torque requirement exceeding the second maximum regenerative torque capacity of the other vehicle.

13. The electrified vehicle of claim 1, wherein when the other vehicle tows an additional vehicle in addition to the electrified vehicle, the controller is further configured to control the motor in the electrified vehicle in further consideration of a regenerative charging efficiency of the additional vehicle.

14. The electrified vehicle of claim 1, wherein when the other vehicle is being towed by an additional vehicle in addition to the electrified vehicle, the controller is further configured to control the motor in the electrified vehicle in further consideration of an additional regenerative charging efficiency of the additional vehicle.

15. A regenerative braking control method of an electrified vehicle, the method comprising:

determining a first target regenerative torque of a motor in the electrified vehicle according to comparison results between a first regenerative charging efficiency of the electrified vehicle and a second regenerative charging efficiency of an other vehicle while the electrified vehicle is towed by the other vehicle or while the electrified vehicle tows the other vehicle; and controlling the motor in the electrified vehicle based on the determined first target regenerative torque, wherein the determining comprises:

in response to the first regenerative charging efficiency being greater than the second regenerative charging efficiency, determining the first target regenerative torque based on a first maximum regenerative torque capacity of the electrified vehicle and a total braking torque requirement; and in response to the first regenerative charging efficiency being less than the second regenerative charging efficiency, determining the first target regenerative torque based on a second maximum regenerative torque capacity of the other vehicle and the total braking torque requirement.

16. The method of claim 15, while the electrified vehicle is towed and while a state of charge of a battery in the other vehicle exceeds a preset overcharge reference value, the method further comprises:

determining the first target regenerative torque of the motor based on the first maximum regenerative torque capacity of the electrified vehicle and the total braking torque requirement;

in response to the first maximum regenerative torque capacity of the electrified vehicle being equal to or greater than the total braking torque requirement, determining the total braking torque requirement to be the first target regenerative torque of the motor;

in response to the first maximum regenerative torque capacity of the electrified vehicle being less than a total regenerative torque requirement, determining the first maximum regenerative torque capacity of the electrified vehicle to be the first target regenerative torque of the motor; and in response to the total braking torque requirement exceeding the first maximum regenerative torque capacity of the electrified vehicle, requesting one of or both of engine clutch engagement and hydraulic braking of the other vehicle.

17. The method of claim 15, wherein a state of charge of a battery in the electrified vehicle exceeds a preset overcharge reference value while the electrified vehicle tows, the method further comprising:

requesting regenerative braking of the other vehicle; and in response to the total braking torque requirement exceeding the second maximum regenerative torque capacity of the other vehicle, performing engine clutch engagement or hydraulic braking in the electrified vehicle.

18. An electrified vehicle comprising:

a motor; and a controller configured to determine a first target regenerative torque of the motor according to a comparison result between a first regenerative charging efficiency of the electrified vehicle and a second regenerative charging efficiency of an other vehicle, and to control the motor based on the determined first target regenerative torque, while the electrified vehicle is towed by the other vehicle or tows the other vehicle;

wherein in response to the first regenerative charging efficiency being greater than the second regenerative charging efficiency, the controller is configured to determine the first target regenerative torque based on a first maximum regenerative torque capacity of the electrified vehicle and a total braking torque requirement, and wherein in response to the first regenerative charging efficiency being less than the second regenerative charging efficiency, the controller is configured to determine the first target regenerative torque based on a second maximum regenerative torque capacity of the other vehicle and the total braking torque requirement;

wherein the controller is configured to determine the first target regenerative torque of the motor based on the second maximum regenerative torque capacity of the other vehicle and based on the total braking torque requirement in response to the first regenerative charging efficiency of the electrified vehicle being less than the second regenerative charging efficiency of the other vehicle; and wherein the controller is further configured to determine excess of the total braking torque requirement over the second maximum regenerative torque capacity of the other vehicle to be the first target regenerative torque of the motor.

19. The electrified vehicle of claim 18, wherein the controller is further configured to request regenerative braking of the other vehicle in response to a state of charge of a battery in the electrified vehicle exceeding a preset overcharge reference value while the electrified vehicle tows.

20. The electrified vehicle of claim 19, wherein the controller is further configured to perform engine clutch engagement or hydraulic braking in response to the total braking torque requirement exceeding the second maximum regenerative torque capacity of the other vehicle.

* * * * *